United States Patent Office 3,538,049
Patented Nov. 3, 1970

3,538,049
SILOXANE COATING COMPOSITIONS
James W. Curry, Dallas, Tex., assignor to Texas Instruments Incorporated, Dallas, Tex., a corporation of Delaware
No Drawing. Filed July 12, 1968, Ser. No. 744,302
Int. Cl. C08f *11/04*
U.S. Cl. 260—46.5                          6 Claims

ABSTRACT OF THE DISCLOSURE

Siloxane compositions produced by the process of reacting a mixture of $(R_1)SiHCl_2$, $(R_2)(CH_2=CH)SiCl_2$ and a third component selected from the group consisting of $(R_3)(CH_3)SiCl_2$ and $(R_4)SiCl_3$ and mixtures thereof with tert-butylalcohol in the presence of an organic solvent where, for example, $R_1$ and $R_2$ represent the methyl radical, $R_3$ and $R_4$ represent the normal octadecyl radical, the $(R_1)SiHCl_2$ and $(R_2)(CH_2=CH)SiCl_2$ are present in a 1:1 molar ratio and the third component is present in a concentration of about 20 mole percent.

A method of applying the siloxane compositions to articles to form a water-repellent coating includes the steps of distributing over the surface of the article a carrier liquid having one of the siloxane compositions disposed therein; evaporating the carrier liquid; and elevating the temperature of the article to cure the siloxane composition.

---

This invention relates to chemistry, and more particularly to siloxane compositions and a method of applying a water-repellent coating to textile and paper articles.

It is known, as exemplified by U.S. Pat. 2,521,673, that organosiloxane polymers may be formed by reacting a tertiary alcohol with organohalosilanes, and further that organosilicon materials can be used as water-repellent coatings. For example, it is suggested that end-blocked $CH_3SiHO$ structures having the following expanded structural formula:

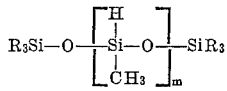

where $R=CH_3$, $C_2H_5$ or $C_6H_5$; and $m=15$–40, may be reacted in the presence of an appropriate organic solvent and a peroxide catalyst with vinyl silicon compounds having the formula:

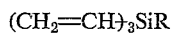

where $R=CH_3$, $C_2H_5$, $CH_2=CH-$ or $C_6H_5$.

The products of this reaction, as explained in U.S. Pat. 3,065,111, may be applied to a material in aqueous form or in solution with an organic solvent, and once applied, cured by heating to about 125° C.–150° C. to create a water-repellent coating. In some instances, curing catalysts such as tin or zinc soaps are required.

SUMMARY

The present invention can be generally described as siloxane compositions produced by the process of reacting a mixture of $(R_1)SiHCl_2$, $(R_2)(CH_2=CH)SiCl_2$ and a third component selected from the class consisting of:

and mixtures thereof with tert-butyl alcohol in the presence of a suitable organic solvent, where $R_1$ and $R_2$ represent lower alkyl radicals, and $R_3$ and $R_4$ represent alkyl radicals having more than 11 carbon atoms.

The invention also encompasses a method of applying a water-repellent coating to a textile or paper article by distributing over the surface of the article a carrier liquid having one of the siloxane compositions described above disposed therein; evaporating the carrier liquid; and elevating the temperature of the article to cure the siloxane composition.

THE PREFERRED EMBODIMENT

A novel siloxane composition can be prepared in accordance with the present invention which will contain several different siloxane structural units and which, when applied to a textile or paper article, provides an excellent water-repellent coating which is softer to the touch than some coatings heretofore used.

Other advantages of the present invention will be appreciated after reference to the following examples:

EXAMPLE I

To a 4 liter separatory funnel was added 2.0 liters of pentane and 6.80 moles of tert-butyl alcohol. From an addition funnel over a five-hour period there was added to the contents of the funnel, dropwise, a halosilane mixture which comprised 1.36 moles of methylvinyldichlorosilane $(CH_3(CH_2=CH)SiCl_2)$; 1.36 moles of methyldichlorosilane $(CH_3SiHCl_2)$ and 0.68 mole of methyl normal-octadecyldichlorosilane $(n-C_{18}H_{37}(CH_3)SiCl_2)$. During addition of the dichlorosilane compounds to the tert-butyl alcohol and pentane solution and for 30 minutes thereafter, the contents of the funnel were stirred.

After stirring was discontinued, an aqueous layer separated in the flask and was removed. The organic layer was then fractionally distilled to remove pentane and tert-butyl chloride formed in the reaction. The last fraction removed during the distillation was at a pot temperature of 70° C. with a head temperature in the column of 41° C. and at a pressure of 748 mm. Hg. The residue from the distillation was then placed on a "Rinco" evaporator for removal of last traces of pentane and tert-butyl chloride.

After evaporation, the residue weighed 409.2 grams. To the residue, which was acid, was added 1 liter of 1 N NaCl and the combined liquid was stirred for 30 minutes, after which the aqueous layer (pH 3.5) was removed. An additional 2 liters of 1 N NaCl was added to the residue and the combined liquid stirred for 30 minutes, after which the mixture was permitted to stand for about 14 hours. An aqueous layer which formed was then removed and the residue, which was an emulsion, was broken by adding pentane and NaCl. The additional aqueous layer was removed. The residue was stirred with $MgSO_4$ for 30 minutes, and filtered through glass wool. The filtrate was then placed on a "Rinco" evaporator to remove last traces of pentane. The resulting residue was found to have a refractive index of 1.4395 $(n_D{}^{25})$, a density of 0.9302 $(d_4{}^{25})$ and a specific refractivity of 0.2830 $(R_D)$.

The resulting material is a siloxane composition having several siloxane structural units chemically combined in an indeterminable array. The individual dichlorosilane compounds are believed to undergo the following reactions:

(1) 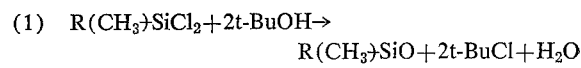

where $R=n-C_{18}H_{37}$, $CH_2=CH-$ and H.

The resulting siloxane composition is believed to consist of complex molecules some of which contain all three possible types of siloxane structural units in chemical combination and others which may contain two or only one of the three possible types of siloxane units in chemical combination.

EXAMPLE II

To a 4 liter separatory funnel was added 2.0 liters of pentane and 4.4 moles of tert-butyl alcohol. From an addition funnel, over a 4.5 hour period, there was added, dropwise, a mixture comprising 0.8 mole of $CH_3SiHCl_2$, 0.8 mole of $CH_3(CH_2=CH)SiCl_2$ and 0.4 mole of normal-octadecyltrichlorosilane ($n$-$C_{18}H_{36}$-$SiCl_3$). The contents of the funnel were permitted to set for about 14 hours. After removal of an aqueous layer which formed, the residue was fractionally distilled with the last fraction being removed at a pot temperature of 70° C., a head temperature of 44° C. and a pressure of 748 mm. Hg. The residue in the pot was placed on a "Rinco" evaporator to remove last traces of pentane and tert.-butyl chloride. The residue, after evaporation, weighed 237.4 grams.

To remove color from the residue, it was heated, admixed with "Norit" (activated carbon) and filtered. The filtrate was only slightly colored, but very acid. To the filtrate was added 1 liter of 1 N NaCl solution and after stirring of the combined liquids for 30 minutes, the mixture was permitted to stand overnight. In an attempt to break the resulting emulsion, there was added solid NaCl, plus an additional 2 liters of 1 N NaCl solution, following which the emulsion was stirred for 30 minutes, then permitted to stand overnight. An aqueous layer formed which was removed, and to the remaining liquid which remained in on emulsified state was added 1.2 liters total of approximately equal quantities of pentane and petroleum ether. After separation of an aqueous layer, approximately 0.5 liter of additional pentane was added and the liquids permitted to stand overnight. Another aqueous layer which formed was removed and 1 liter of petroleum ether and a small quantity of NaCl were added to the residue. The emulsion was broken and the remaining aqueous layer removed. To the residue was added $MgSO_4$ which was then removed by filtration. The filtrate was placed on a "Rinco" evaporator for removal of the pentane and petroleum ether.

After the pentane and petroleum ether had been evaporated, the residue was filtered through glass wool and found to have a refractive index of 1.4420 ($n_D^{25}$), a density of 0.9486 ($d_4^{25}$) and a specific refractivity of 0.2732 ($R_D$).

The resulting material is a siloxane composition which has several siloxane structural units chemically combined in an indeterminable form. The dichlorosilane compounds are believed to undergo the reaction (1) above and the trichlorosilane compound is believed to undergo the following reaction:

(2) 

where R=$n$-$C_{18}H_{37}$.

The resulting siloxane composition is, as explained in Example I, believed to be formed of complex molecules containing one, two, or all three of the possible types of siloxane structural units in chemical combination.

The siloxane compositions prepared as described in Examples I and II are extremely useful as water-repellency coatings, as will be more clearly understood by reference to the following examples.

EXAMPLE III

A benzene solution containing 0.015 weight percent of the siloxane composition of Example I was prepared and sprayed on both sides of several 4 x 4 inch paper handsheets. A sufficient quantity of the solution was sprayed on the sheets to add a quantity of the siloxane composition equal to 0.2 percent of the weight of the handsheet, 0.1 percent to each side of the sheet. The siloxane composition was evenly distributed over the surface of the sheet by spraying the sheet with pure solvent, after which the sheets were air dried and then cured for ten minutes at 350° F.

The treated handsheets were tested for water repellency by an empirical "boat" test. The handsheets were folded to form "boats" having a one-inch square flat bottom with sides folded back to prevent wicking from the edges. The boats were then placed on the surface of distilled water at 73° F. None of the specimens were penetrated by the water over a ten-minute interval, after which they were removed.

EXAMPLE IV

The test of Example III was repeated, except the siloxane composition of Example I was dissolved in a toluene solution and comprised 0.015 weight percent thereof. A catalyst solution prepared by admixing 25 ml. isopropyl alcohol ond 1.025 grams of chloroplatinic acid ($H_2PtCl_6$) was then added to the toluene and siloxane solution in an amount equivalent to 0.0465 ml. per 10 grams of the siloxane composition. The catalyzed solution was then sprayed on paper handsheets as in Example III to provide an add-on amount of 0.2 weight percent of the siloxane composition. After air drying, to evaporate the toluene, the handsheets were heated to 350° F. for 10 minutes.

Boats prepared from the handsheets had no penetration over the 10-minute testing period.

EXAMPLE V

The procedure of Example IV was repeated, except the solution containing the toluene, siloxane composition and catalyst was refluxed for 1 hour before application of the solution to the paper handsheets. After curing at 350° F. for 10 minutes, "boats" were formed as described above. Testing of the boats revealed that no water penetrated the boats for the 10-minute testing period.

EXAMPLE VI

A toluene solution containing 1.0 percent by weight of the siloxane composition of Example I was prepared and catalyzed with the chloroplatinic acid solution described in Example IV. The quantity of catalyst added was sufficient to provide 0.0465 ml. of the catalyst solution per 10 grams of the siloxane composition of Example I.

Paper handsheets (4 x 4 inches) were refluxed in the toluene solution for 1 hour and air dried. Some of the handsheets were cured for 10 minutes at 220° F. and others were cured for 10 minutes at 350° F.

Boats prepared from paper handsheets cured at both temperatures were tested. Water failed to penetrate any of the boats for the 10-minute testing period.

EXAMPLE VII

The procedure of Example VI was repeated, except a toluene solution containing 0.5 percent of the siloxane mixture of Example I was employed, with a proportional amount of the chloroplatinic catalyst being used.

After refluxing for 1 hour in the solution, the paper handsheets were air dried and cured for 10 minutes at 350° F.

Water failed to penetrate boats prepared from the handsheets during the 10-minute testing period.

EXAMPLE VIII

The procedure of Example VII was repeated, except the toluene solution prepared contained 0.1 percent, by weight, of the siloxane mixture of Example I. Here, as in Example VII, sufficient chloroplatinic acid catalyst was added to provide 0.0465 milliliters of the catalyst solution for each 10 grams of the siloxane composition. Paper handsheets refluxed in the toluene solution for 1 hour were dried and cured for 10 minutes at 350° F.

Boats prepared from the treated handsheets were tested for a ten-minute period, during which the water penetrated the boat at several points in an irregular pattern.

EXAMPLE IX

The procedure and conditions of Example III were repeated, except the siloxane composition of Example II was employed.

Boats prepared from the treated paper handsheets were not penetrated by the water during the 10-minute testing period.

EXAMPLE X

The procedure and conditions of Example IV were repeated, except the siloxane composition in Example II was employed and the quantity of the chloroplatinic acid catalyst added was sufficient to provide 0.0465 ml. of the catalyst solution per 10 grams of the siloxane composition.

Boats prepared from the treated paper handsheets, after curing for 10 minutes at 350° F. were not penetrated by water during the 10-minute testing period.

EXAMPLE XI

The procedure and conditions of Example V were repeated, except the siloxane composition of Example II was employed. Boats prepared from the treated paper handsheets were not penetrated by the water for the 10-minute testing period.

EXAMPLE XII

The procedure and conditions of Example VI were repeated, except the siloxane composition of Example II was employed.

Water did not penetrate the boats prepared from paper handsheets cured at either 220° F. for the 10-minute testing period.

EXAMPLE XIII

The procedure and conditions of Example VII were repeated, except the siloxane composition of Example II was employed.

Boats prepared from the treated paper handsheets were not penetrated by the water during the 10-minute testing period.

EXAMPLE XIV

The procedure and conditions of Example VIII were repeated, except the siloxane composition in Example II was employed.

Boats prepared from the treated paper handsheets were not penetrated by water during the 10-minute testing period.

EXAMPLE XV

The toluene solution containing 2.0 percent by weight of the siloxane mixture described in Example I was prepared by admixing 6.0 grams of the siloxane composition with 294 grams of toluene. To the toluene solution were added 2 inch squares of desized and unbleached cotton cloth and 2 drops of the chloroplatinic acid solution described in Example IV.

The cotton samples were refluxed in the solution for one hour at 110° C., removed and air dried at ambient temperature. The samples, which were weighed before being refluxed, and after air drying, were found to have increased in weight, between 0.66 and 0.72 percent, indicating that between 0.66 and 0.72 percent of the siloxane composition had been picked up by the cotton cloth. The samples, after being placed in a horizontal position and having 0.5 milliliter of water placed on each, repelled the water for a period of 18 minutes.

EXAMPLE XVI

The procedure of Example XV was repeated, except a toluene solution containing 4.0 percent by weight of the siloxane mixture of Example I was employed.

The cloth samples, which had been refluxed for 1 hour in the solution at 110° C., were found to have increased in weight between 2.16 and 2.46 percent after air drying. The samples, after being placed in horizontal position having ½ milliliter of water placed on each, repelled the water for 6.5 hours, at which point in time the water had completely evaporated.

The siloxane compositions of the present invention may also be applied to textile or paper articles by emulsifying the siloxane compositions and contacting the article with the emulsion. For representative techniques, reference is made to the following examples.

EXAMPLE XVII

A nonionic emulsion of the siloxane composition of Example II was prepared by first admixing 28 grams of distilled water with 2.0 grams of a nonionic emulsion stabilizer marketed under the trademark "Tween 81." To the water and stabilizer was added, dropwise, 20 grams of the siloxane composition of Example II, while agitating the liquid at a moderate speed in a micromixer. The predominant particle size in the emulsion, determined at 860× utilizing a microscope fitted with an ocular micrometer was less than 1.0 μm.

The resulting emulsion was then catalyzed with 0.0930 ml. of the chloroplatinic acid solution described in Example IV. The catalyzed emulsion was then diluted with water to produce a final emulsion having between about 0.2 and 0.25 weight percent of the siloxane composition of Example II. Paper handsheets such as described above were, after being weighed, immersed in the diluted emulsion. After immersion, excess emulsion was removed by passing the sheets through the nip of rubber squeeze rolls. The treated handsheets were weighed immediately and then air dried at 73° F. at a relative humidity of 50%. The percent of siloxane picked up by the handsheets was determined by multiplying the difference between the wet weight of the handsheet and the dry weight of the untreated handsheets by 100 times the weight percent of the siloxane composition in the emulsion and dividing the resulting number by the dry weight of the untreated specimens. The average pick up percentage for the handsheets was 0.25%.

The treated handsheets were then heated to 350° F. for a period of two minutes to cure the siloxane composition deposited on the surface. Boats were prepared from the handsheets, after curing, and tested as described above. Boats prepared from the handsheets had no penetration at the end of the 10-minute testing period.

EXAMPLE XVIII

A cationic emulsion of the siloxane composition of Example II was prepared by adding, dropwise, 20 grams of the siloxane composition of Example II to a mixture of 10 grams of glycerine and 0.3 grams of a cationic emulsion stabilizer marketed under the trademark "Ammonyx-G." The resulting mixture was then heated until a clear solution resulted. Distilled water (19.4 grams) was then added, dropwise, while the liquid was vigorously agitated in a micromixer. The resulting emulsion was then cooled to 73° F. while being agitated at a moderate rate. The predominant particle size in the emulsion was again less than 1.0 μm.

Handsheets were immersed in the emulsion after it had been catalyzed with 0.093 ml. of the chloroplatinic acid solution and diluted with distilled water to produce an emulsion having between 0.2 and 0.25 weight percent of the siloxane composition of Example II. The handsheets were then treated as described in Example XVII. The handsheets picked up 0.26 weight percent of the siloxane composition, and after curing for the two-minute period at 350° F., were tested by the "boat" technique. No water penetrated the boats during the 10-minute test period.

EXAMPLE XIX

An anionic emulsion of the siloxane composition of Example II was prepared by first admixing 20 grams of the siloxane composition of Example II with 1.3 grams of oleic acid. To the mixture was then added 0.7 grams of triethanolamine, and the resulting mixture was blended thoroughly and added to distilled water (28 grams) with vigorous stirring in a micromixer. The predominant particle size in the resulting emulsion was less than 1.0 μm.

Handsheets were immersed in the emulsion after it had been catalyzed with 0.093 ml. of the chloroplatinic acid solution and diluted with distilled water to produce an emulsion containing betewen about 0.2 and 0.25 weight percent of the siloxane composition. After subsequent treatment as described in Example XVII, the handsheets had picked up 0.27 weight percent of the siloxane composition.

No water penetrated boats prepared from the handsheets after curing and testing by the procedure described in Example XVII.

EXAMPLE XX

The test Example XVII was repeated exactly, except the siloxane composition of Example I was employed. Handsheets after treatment had picked up 0.25 weight percent of the siloxane composition. Water failed to penetrate boats prepared from the treated and cured hand sheets during the 10-minute test period.

EXAMPLE XXI

The test of Example XVIII was repeated exactly, except the siloxane composition of Example I was employed. Boats prepared from the handsheets were water-repellent, but not as water-repellent as those prepared in Example XX.

EXAMPLE XXII

The test of Example XIX was repeated exactly, except the siloxane composition of Example I was employed. Boats prepared from the handsheets were water-repellent, but not as water-repellent as those prepared in Example XX.

Various nonionic, cationic and anionic stabilizers may be employed in preparing emulsions of the siloxane compositions of the present invention. In addition to "Tween 81," there may be used as a nonionic stabilizer various of commercially available compounds such as "Neutronyx 330" and "Neutronyx 600."

Typical of cationic stabilizers which may be employed in addition to the "Ammonyx-G" mentioned above, are "Onyxsan HSB" and "Armac HT." Emulsions containing "Armac HT" are not as stable as emulsions formed with the other stabilizers and are thus not preferred.

Typical of anionic stabilizers which may be employed, in addition to the triethanolamine oleate which was prepared by admixing 3.5 parts of triethanolamine and 6.5 parts of oleic acid, are aminomethylpropanol oleate and ammonium oleate. The aminomethylpropanol oleate may be prepared by admixing, for example, 2.4 parts of aminomethylpropanol with 7.6 parts of oleic acid, while the ammonium oleate may be prepared by admixing 1.1 parts of ammonium hydroxide (58 percent by weight solution) with 8.9 parts of oleic acid. As a general rule, the anionic emulsions contain rather large particles and are not, for this reason, as useful as nonionic and cationic emulsions.

As is clear from consideration of the above examples, the siloxane compositions may be disposed in a carrier liquid either in emulsion form or in solution.

The siloxane compositions of Examples I and II provide water-repellent coatings which are softer to the touch than some coatings heretofore used.

The siloxane compositions are believed to provide coatings which are softer to the touch due to the presence of normal-octadecyl siloxane units which are present in the composition.

While the above examples have been directed to the use of $(R_1)SiHCl_2$, $(R_2)(CH_2\text{=}CH\text{)}SiCl_2)$ and either $(R_3)(CH_3\text{)}SiCl_2$ or $(R_4)SiCl_3$, where $R_1$ and $R_2$ were methyl radicals and $R_3$ and $R_4$ were normal-octadecyl radicals, other alkyl radicals may be conveniently and easily substituted. For example, $R_1$ and $R_2$ may represent, in addition to the methyl radical, any lower alkyl radical such as ethyl and propyl radicals. $R_3$ and $R_4$ may represent any alkyl radical having greater than 11 carbon atoms which may be attached to the halosilicon structural unit.

It will also be clear from examination of the above examples that a mixture of $(R_3)(CH_3\text{)}SiCl_2$ and $(R_4)SiCl_3$ could be used in combination with the $(R_1)SiHCl_2$ and $(R_2)(CH_2\text{=}CH\text{)}SiCl_2$ to produce siloxane composition equivalent in properties to those described. Further, the improved "touch" of the coatings can be achieved with concentrations of the $$(R_3)(CH_3\text{)}SiCl_2$$

and/or $(R_4)SiCl_3$ between 10 and 50 mole percent of the starting organochlorosilane compounds.

While rather specific terms have been used to describe various embodiments of the invention, they are not intended nor should they be construed as a limitation upon the invention as defined by the following claims.

What is claimed is:

1. The sixoxane products produced by the process of: reacting a mixture of $(R_1)SiHCl_2$, $$(R_2)(CH_2\text{=}CH\text{)}SiCl_2$$

and a third component selected from the group consisting of: $(R_3)(CH_3\text{)}SiCl_2$ and $(R_4)SiCl_3$ and mixtures thereof with tert-butyl alcohol in the presence of an organic solvent, where $R_1$ and $R_2$ represent lower alkyl radicals, $R_3$ and $R_4$ represent alkyl radicals having more than 11 carbon atoms;

removing tert-butyl chloride and water formed in the reaction and separating the organic solvent from the product.

2. The products of claim 1 wherein: the reactant mixture contains $(R_1)SiHCl_2$ and $$(R_2)(CH_2\text{=}CH\text{)}SiCl_2$$

in about a 1:1 molar ratio and the third component is present in an amount from about 10 to 30 mole percent.

3. The products of claim 1, wherein $R_1$ and $R_2$ represent $CH_3$—, and $R_3$ and $R_4$ represent n-$C_{18}H_{37}$—.

4. The products of claim 1 wherein the third component is present in the amount of 20 mole percent.

5. The products of claim 1, wherein the third component is $(R_3)(CH_3\text{)}SiCl_2$.

6. The products of claim 1, wherein the third component is $(R_4)SiCl_3$.

References Cited

UNITED STATES PATENTS

| | | | |
|---|---|---|---|
| 2,486,162 | 10/1949 | Hyde | 260—46.5 |
| 2,521,673 | 9/1950 | Britton et al. | 260—46.5 |
| 3,090,765 | 5/1963 | Nitzsche et al. | 260—37 |

DONALD E. CZAJA, Primary Examiner

MELVYN I. MARQUIS, Assistant Examiner

U.S. Cl. X.R.

117—155; 260—18, 29.2, 448.2